UNITED STATES PATENT OFFICE.

PHILIP F. APFEL, OF SEATTLE, WASHINGTON, AND RALPH L. EARNEST, OF PORTLAND, OREGON.

PROTECTING PILES AGAINST WORMS, &c.

No. 883,507.  Specification of Letters Patent.  Patented March 31, 1908.

Application filed July 27, 1907. Serial No. 385,768.

*To all whom it may concern:*

Be it known that we, PHILIP F. APFEL, a citizen of the United States, residing in Seattle, in the county of King and State of Washington, and RALPH L. EARNEST, a citizen of the United States, residing in Portland, in the county of Multnomah and State of Oregon, have invented a new and useful Improvement in the Art of Protecting Piles Against Worms, &c., of which the following is a specification.

This invention relates to an improved method of rendering the piles used in salt water docks and wharves proof against the teredo and other destructive worms and insects.

We have discovered the fact that a certain composition or cement known to us possesses the ability to repel the teredo and other boring worms and insects with which the piles used in docks, wharves and other structures located on salt water are infested, and our improvement in the art of preserving such piles consists in coating or otherwise covering them with said composition or cement.

In the preparation of the composition, we take magnesium carbonate and magnesium oxid and mix them with aqueous magnesium chlorid, adding a suitable filler such as gypsum, sand, asbestos or the like, producing a mixture of the desired consistency and adapted to be spread upon the piles. This composition we apply to the piles either with a trowel or in some other suitable way, coating them with the composition which becomes hard soon after application. Or instead of coating the piles directly, we pass canvas or burlap through the mixture so that the same becomes thoroughly coated and saturated with the paint, and then wrap this canvas or burlap around the piles and secure it thereto by nails, staples or other suitable fastenings. If desired, the piles may be covered and reinforced with wire cloth or expanded metal mechanically fastened to them, before the paint or cement is applied.

It will be understood that we do not limit ourselves to the use of all the ingredients above mentioned in the protecting composition, the essential feature being that it embody some one or more of the stated forms of magnesium oxid.

We claim:—

In the process of preserving wood used in contact with salt water, the improvement which consists in applying to the surface thereof a composition consisting of magnesium carbonate, magnesium oxid, an aqueous mixture of magnesium chlorid, and a suitable filler.

PHILIP F. APFEL.
RALPH L. EARNEST.

Witnesses as to Philip F. Apfel:
ELMER E. HARRISON,
CLARE E. MURPHY.

Witnesses as to Ralph L. Earnest:
WALLACE MCCAMANT,
FRED STEIWER.